(12) United States Patent
Chang

(10) Patent No.: US 6,382,509 B1
(45) Date of Patent: May 7, 2002

(54) SIGNAL READING CONTROL METHOD FOR BARCODE SCANNER

(76) Inventor: Yu-Chun Chang, 4F, No. 225, Chin-Lung Rd., Nei-Hu Dist., Taipei (TW)

( * ) Notice: Subject to any disclaimer, the term of this patent is extended or adjusted under 35 U.S.C. 154(b) by 0 days.

(21) Appl. No.: 09/824,095

(22) Filed: Apr. 3, 2001

(51) Int. Cl.$^7$ ................................................ G06K 7/10

(52) U.S. Cl. ............................ 235/462.01; 235/462.3; 235/462.31; 235/472.01

(58) Field of Search ......................... 235/462.01, 462.3, 235/462.31, 472.01

(56) References Cited

U.S. PATENT DOCUMENTS 5,821,520 A * 10/1998 Mulla et al. ........... 235/462.01

FOREIGN PATENT DOCUMENTS

JP          2053194       * 2/1990

* cited by examiner

Primary Examiner—Harold I. Pitts
(74) Attorney, Agent, or Firm—Bacon & Thomas, PLLC

(57) ABSTRACT

A signal reading control method for barcode scanner that does not activate the scanner structure temporarily when the button key of the barcode scanner is pressed, and applies a constant frequency wave on a laser diode for the same to emit photo points at an oscillating fashion. When an object enters the readable range, the light detect sensor of the barcode scanner receives reflection light signal which has same frequency as the one applied on the photo points. The signal frequency is also same as the one emitted by the laser diode thereby may confirm the object has entered in the readable range. The laser photo points project on the barcode of the object and the barcode scanner converts the laser diode to constant current driving and activates the scanner structure to make the laser points to become a scanning line for reading the barcode.

4 Claims, 2 Drawing Sheets

SIGNAL READING CONTROL METHOD FOR BARCODE SCANNER

BACKGROUND OF THE INVENTION

This invention relates to a signal reading control method for barcode scanner and particularly a control method that uses existing optical structure of a barcode scanner and provides an indication light which contains carrier frequency to project on an object, and receives confirmation of reflection signal frequency to make sure that the object is located within the reading range, and confirms the barcode scanner has been correctly pointing toward the barcode, then activates barcode reading operation.

Barcode scanner is widely used nowadays as a point-of-sales terminal to count consumers' buying price at the counter. A cashier either takes the goods to scan in front of a barcode scanner, or takes a portable handheld barcode scanner to scan over the barcode of goods for reading the barcode image into the point-of-sale terminal for getting the price of each item and accumulated total amount at a display screen.

A conventional handheld barcode scanner starts scanning operation when a switch is pressed. One of such examples is disclosed in U.S. Pat. No. 5,821,520 which is a system capable of processing photoelectric signals for barcode scanners. The barcode scanner can read different reflection value from the barcode area and non-barcode area adjacent the barcode area. It includes a decoder for decoding input signals, a signal process circuit for processing signals output by the scanner and generates an input signal to feed into a decoder thereby to detect and delete the non-barcode area signals output by the scanner. The signal process circuit can generate a signal to input different barcode symbols into the decoder. The signal process circuit includes an eraser which has deleting function for deleting signals which have a shorter generation time period than a preset time period, one or two proportional calculator for calculating signal interval characteristics output by the scanner, and a second proportional calculator for calculating signal characteristics of non-barcode area output by the scanner. However the foregoing barcode scanner has disadvantages. First, when there is no object (barcode) presented in the effective reading range, the barcode scanner is still operational. The operation is meaningless and wastes electric power. Second, before the scanning lines are presented, there is no way of knowing if the scanner is correctly targeting the object.

There are other types of similar product being marketed. One of such products includes an additional reflective sensing element for detecting the object. Such an element usually can read at a distance of a few centimeter. A long distance barcode reader usually can read a distance of 15 cm, or 20 cm or even over 30 cm. Hence it is not desirable. Moreover, these types of reflective sensing element mostly are infrared light elements which have no object indication capability.

SUMMARY OF THE INVENTION

The primary object of this invention is to resolve aforesaid disadvantages, and to use the existing optical structure of the barcode scanner, and to provide an indication light which contains carrier frequency to project on an object, and to receive confirmation of the reflection signal frequency to make sure the object is located within the reading range, and to confirm the barcode scanner has been correctly pointing toward the barcode before starting barcode reading operation.

Another object of this invention is to correctly select the barcode to be read when targeting an object which has a plurality of barcodes printed thereon.

A further object of this invention is to use same optical structure and same signal receiving and amplifying circuit in the barcode scanner for the front stage detection operation and rear stage barcode reading operation such that detection positioning will be accurately attained and also to save power consumption.

To attain aforesaid objects, the signal reading control method according to this invention uses a laser element to generate light for detecting the object and indicating correct address of the barcode. When the button key of the barcode scanner is pressed, the scanner structure is not activated temporarily, at the same time a constant frequency oscillation wave is applied on a laser diode. The laser diode emits photo points in an oscillating manner at the same optical path of the barcode scanner. When a scanning object is being moved in the readable range, the light detect sensor of the barcode scanner will receive the reflection signal of same frequency added to the photo points. After signal amplification and wave forming process, a correct reflection signal will be obtained at the output pin. Hence once the signal frequency is confirmed to be same as the one emitted by the laser diode, it may be confirmed that the object has been entered in the readable range. In the mean time, the laser photo points have been projected on the scanning barcode, the barcode scanner will convert the laser diode to a constant current driving state, and activate the scanning structure to make the laser photo points become a scanning line for reading the barcode.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENT

Figure 1:
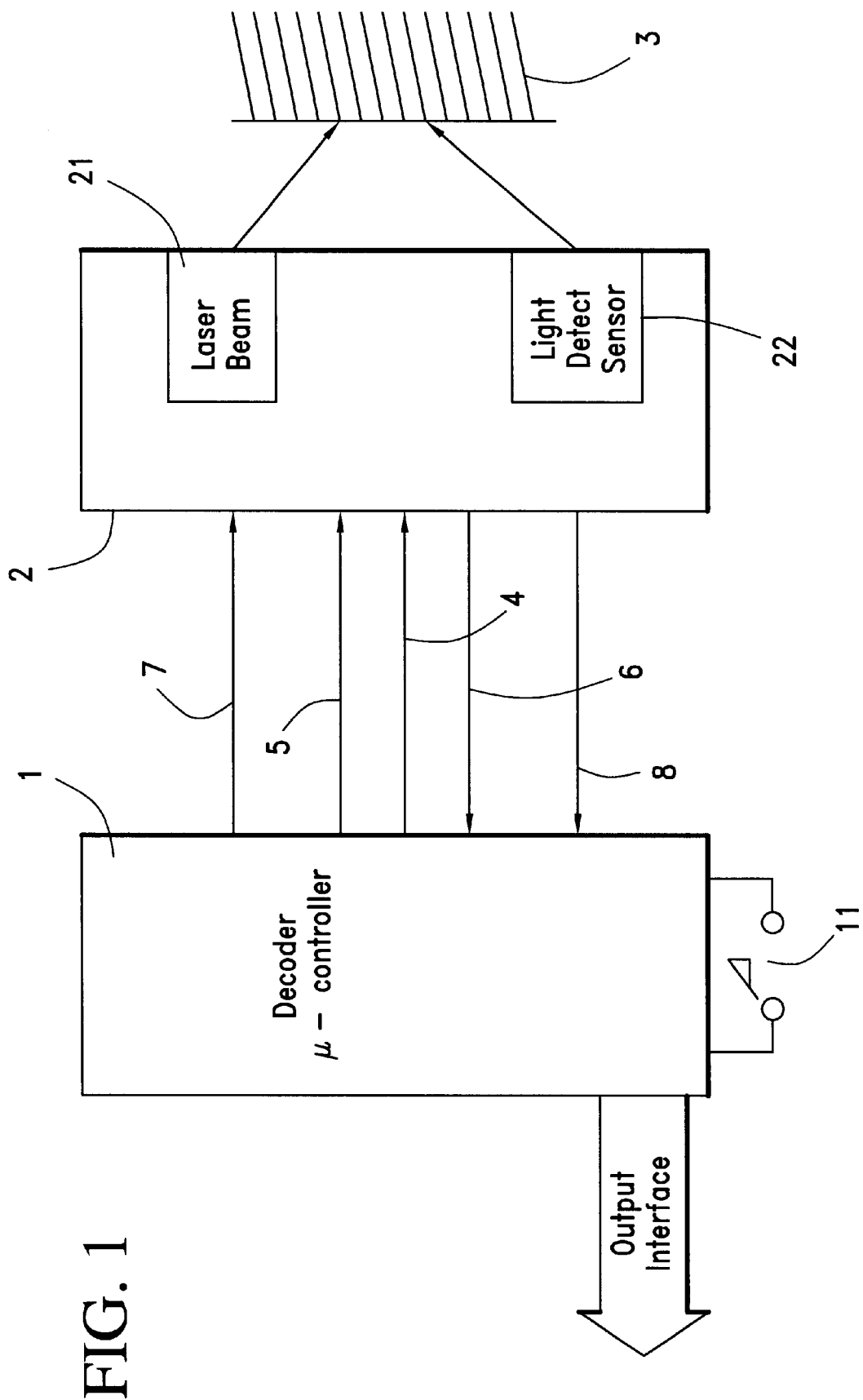
FIG. 1 is a circuit diagram of this invention.

Referring to FIG. 1, the signal reading control method for barcode scanner according to this invention employs a hardware circuit which includes a Decoder u-Controller 1 and a laser engine 2. The laser element generates light for detecting an object and indicating the accurate barcode address. When the button key of the barcode scanner is pressed, the scanner structure is not activated temporarily. Instead, a constant frequency oscillation wave is applied on the laser diode. The laser diode emits photo points in an oscillating fashion with an optical path coincided with that of the barcode scanner. When a scanning object enters the readable range, the sensor element of the barcode scanner will receive a reflection signal of same frequency as the one added to the photo points. The signal is amplified and under wave forming process, and will give the output pin a correct reflection signal. At this stage, if the signal frequency is confirmed same as the one emitted by the laser diode, it can be confirmed that the object has entered the readable range. In the mean time, the laser photo points have projected on the barcode to be read, the barcode scanner will convert the laser diode to a constant current driving state and activates the scanner structure to make the laser photo points become a scanning line for reading the barcode. This is the front stage detection operation which uses same optical structure and same signal receiving and amplifying circuit as the rear stage barcode reading operation. Hence it can attain correct detection positioning and save power consumption.

The Decoder u-Controller 1 set forth above includes a control software for reading barcode and has a switch 11 which may be pressed to activate power supply.

The laser engine 2 has dual transmission with the Decoder u-Controller 1 and has a laser beam 21 and a light detect sensor 22. The laser beam 21 projects on the barcode 3 of the scanning object. The light detect sensor 22 detects the reflection light from the detecting barcode 3.

When the switch 11 of the Decoder u-Controller 1 is pressed, power on 4 is started to activate the laser engine 2. The laser enable end 5 of the Decoder u-Controller 1 sends out an oscillation signal which is applied on the laser diode of the laser engine 2 for emission. At this stage, the scan enable 7 is closed and the laser engine 2 does not scan. The Decoder u-Controller 1 starts inspecting signals at the data output 8. When an object enters the readable range, the light signal emitted by the laser beam 21 will be reflected. When the Decoder u-Controller 1 detects the reflection signal being same as the emitting signal, the laser enable 5 will be converted to a constant current activating state and activates the scan enable 7 to drive the scanner structure starting operation, and the laser photo points will scan in a linear form, and through the start of scan 6 to read the signal synchronously, and to read barcode data at the data output 8.

Figure 2:
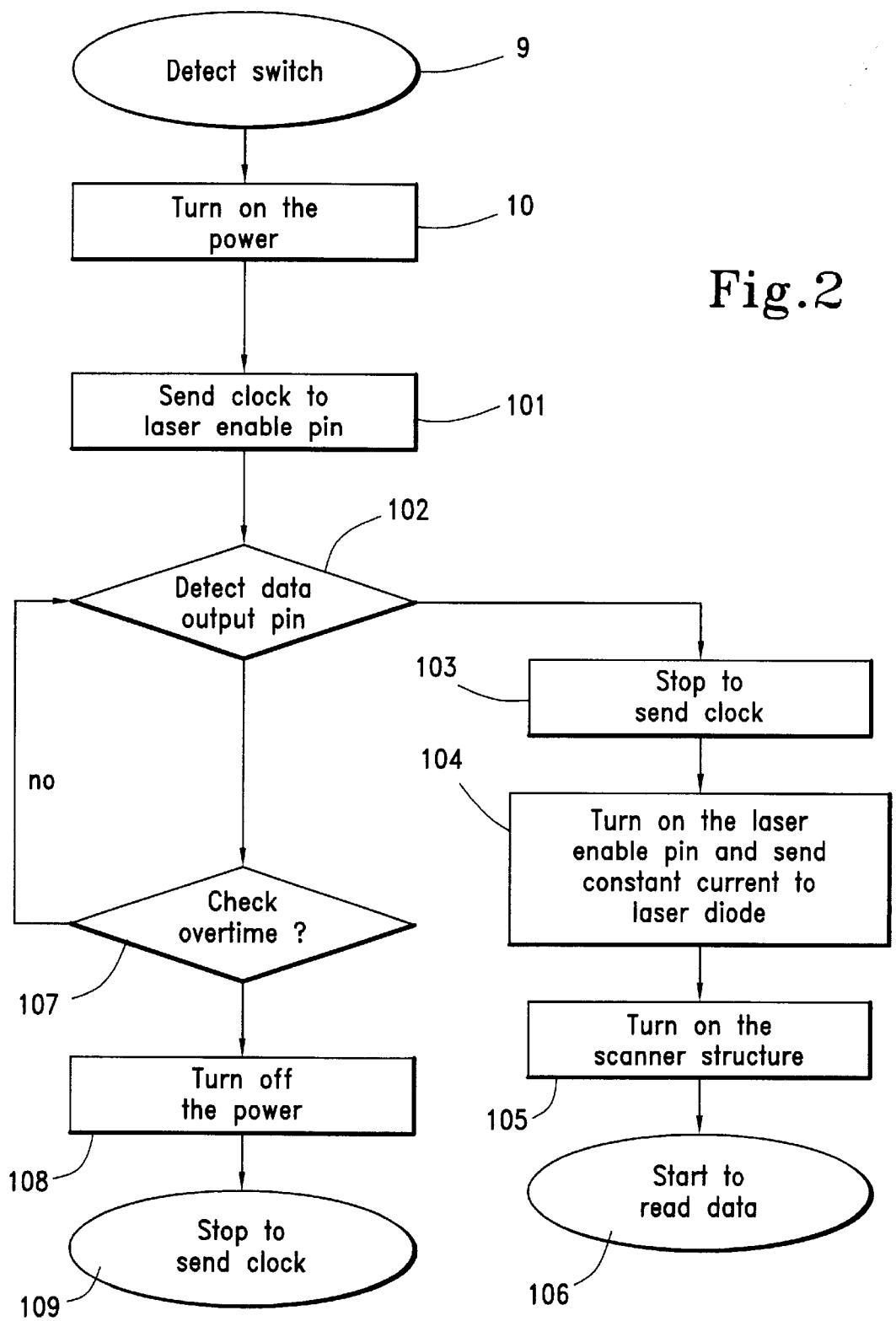
FIG. 2 is a software flow chart of this invention.

Referring to FIG. 2 for the software process flow, the operation steps include: detect switch 9, turn on the power 10, then send clock to laser enable pin 101, go to the detect data output pin 102. If signal correct is detected at the output pin 102, stop to send clock 103, and turn on the laser enable pin and send constant current to laser diode 104, and turn on the scanner structure 105 and start to read data 106.

If no signal is detected at the detect data output pin 102, check overtime 107. If no overtime being detected, branch to the detect data output pin 102; if overtime is detected, turn off the power 108 and immediately stop to send clock 109 to the laser enable pin.

Aforesaid process is the front stage detection operation. The rear stage reading barcode operation uses same optical structure and same signal receiving and amplifying circuit, thereby may attain correct detection positioning and save power consumption.

What is claimed is:

1. A signal control method for a barcode scanner to accurately read a barcode on an object, comprising the steps of:
   a. using a laser element to generate light for detecting the object and indicating the correct address of the barcode, and not activating the scanner structure when the button key of the barcode scanner being pressed;
   b. applying a constant frequency oscillation wave on a laser diode which emits photo points at an oscillation fashion with same optical path of the barcode scanner, and receiving reflecting signal of a frequency same as the one applied on the photo points by a light detect sensor of the barcode scanner when the object entering in a readable range, and amplifying and processing the signal to obtain a correct reflection signal at an output pin, and confirming signal frequency being same as the emitting frequency from the laser diode to confirm the object having entered in the readable range; and
   c. converting the laser diode to constant current driving by the barcode scanner when the object has entered in the readable range and the laser photo points have projected on the scanning barcode for activating the scanner structure to change the laser photo points to a scanning line for reading the barcode.

2. The signal control method of claim 1, wherein the laser element is a laser engine which includes a laser beam and a light detect sensor.

3. The signal control method of claim 1, wherein the button key is a switch linked to a decoder u-controller.

4. The signal control method of claim 1, wherein the front stage detection operation for the signal control reading method of the barcode scanner uses same optical structure and same signal receiving and amplifying circuits as the rear stage reading barcode operation.

* * * * *